United States Patent
Barton et al.

(10) Patent No.: US 6,960,401 B2
(45) Date of Patent: Nov. 1, 2005

(54) FUEL CELL PURGING METHOD AND APPARATUS

(75) Inventors: Russell Howard Barton, New Westminister (CA); Tan Duc Uong, Coquitlam (CA); Charles Joseph Schembri, Langley (CA); George Alexander Skinner, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 508 days.

(21) Appl. No.: 09/916,211

(22) Filed: Jul. 25, 2001

(65) Prior Publication Data

US 2003/0022041 A1 Jan. 30, 2003

(51) Int. Cl.[7] .................................................. H01M 8/04
(52) U.S. Cl. ........................................ 429/13; 429/23
(58) Field of Search ............................. 429/13, 22, 23

(56) References Cited

U.S. PATENT DOCUMENTS

| | | | |
|---|---|---|---|
| 3,317,348 A | 5/1967 | Winsel ........................ | 136/86 |
| 3,553,029 A | 1/1971 | Winsel ........................ | 136/86 |
| 3,580,741 A | 5/1971 | Hovious et al. ............... | 136/86 |
| 3,615,842 A | 10/1971 | Craft et al. .................... | 136/86 |
| 3,666,562 A | 5/1972 | Sprengel ................... | 136/86 B |
| 3,697,325 A | 10/1972 | Baude ...................... | 136/86 B |
| 3,775,282 A | 11/1973 | Craft et al. ................. | 204/266 |
| 3,850,696 A | 11/1974 | Summers et al. .......... | 136/86 B |
| 3,935,028 A * | 1/1976 | Strasser et al. ................ | 429/14 |
| 4,243,731 A | 1/1981 | Cheron ......................... | 429/13 |
| 5,397,655 A | 3/1995 | Bette et al. .................... | 429/13 |
| 5,478,662 A | 12/1995 | Strasser ....................... | 429/13 |
| 6,093,500 A | 7/2000 | Margiott et al. .............. | 429/13 |
| 6,093,502 A | 7/2000 | Carlstrom, Jr. et al. ....... | 429/25 |
| 6,140,820 A | 10/2000 | James ......................... | 324/434 |
| 6,242,120 B1 | 6/2001 | Herron ......................... | 429/22 |
| 6,423,434 B1 | 7/2002 | Pratt et al. .................... | 429/13 |
| 6,426,158 B1 | 7/2002 | Pratt et al. .................... | 429/13 |
| 6,569,549 B1 * | 5/2003 | Sawyer ......................... | 429/13 |
| 2001/0014415 A1 | 8/2001 | Iio et al. ....................... | 429/22 |
| 2002/0076583 A1 * | 6/2002 | Reisser et al. ................ | 429/13 |
| 2002/0094467 A1 | 7/2002 | Nonobe et al. ............... | 429/34 |
| 2002/0094468 A1 | 7/2002 | Miura et al. .................. | 429/34 |
| 2002/0094469 A1 | 7/2002 | Yoshizumi et al. ........... | 429/34 |
| 2003/0022031 A1 | 1/2003 | Manery | |
| 2003/0022036 A1 | 1/2003 | Parr | |
| 2003/0022037 A1 | 1/2003 | Parr et al. | |
| 2003/0022040 A1 | 1/2003 | Wells | |
| 2003/0022042 A1 | 1/2003 | Wells et al. | |
| 2003/0022045 A1 | 1/2003 | Wells et al. | |
| 2003/0022050 A1 | 1/2003 | Barton et al. | |
| 2003/0022838 A1 | 1/2003 | Vaal et al. | |

FOREIGN PATENT DOCUMENTS

| | | |
|---|---|---|
| EP | 982 788 A2 | 3/2000 |
| EP | 1 018 774 A1 | 7/2000 |
| GB | 1 223 941 | 3/1971 |
| JP | 63-029460 | 2/1988 |
| WO | WO 00/74162 | 12/2000 |
| WO | WO 01/26173 A1 | 4/2001 |
| WO | WO 01/26174 A1 | 4/2001 |

OTHER PUBLICATIONS

Abstract EP 1 018 774 A1 esp@cenet.com database, Jul. 12, 2000.

* cited by examiner

*Primary Examiner*—Jonathan Crepeau
(74) *Attorney, Agent, or Firm*—Seed IP Law Group PLLC

(57) ABSTRACT

A purge system for fuel cell stack includes a purge valve to regulate exhaust from the fuel cell stack in response control signals from a controller in response to a voltage across a purge cell portion of a fuel cell stack. The purge valve is opened when the voltage across the purge cell portion falls below a defined percentage of a threshold voltage. The threshold voltage can be equal to an average cell voltage of some or all of the fuel cells of the fuel cell stack. The purge may include one or more successive openings of the purge valve of controlled purge durations.

13 Claims, 10 Drawing Sheets

FUEL CELL PURGING METHOD AND APPARATUS

BACKGROUND OF THE INVENTION

1. Technical Field

The present invention relates to fuel cells, and particularly to control systems for fuel cells.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Due to their zero- or low-emission nature, and ability to operate using renewable fuels, the use of fuel cells as primary and/or backup power supplies is likely to become increasingly prevalent. For example, a fuel cell stack can serve as an uninterruptible power supply for computer, medical, or refrigeration equipment in a home, office, or commercial environment. Other uses are of course possible.

Consequently, there is a need for improved control systems for fuel cell systems, and for methods of controlling such fuel cell systems.

SUMMARY OF THE INVENTION

Certain fuel cells are designed to operate in a dead-ended mode on one or both reactants. In this situation the reactant used is generally substantially pure. Typically a purge valve (which is normally closed in dead-ended operation) is provided at the reactant outlet port for periodic venting of accumulations of non-reactive components which can build up in the reactant channels in dead-ended operation. The reactant flow path through the fuel cell stack can be configured so that non-reactive components tend to accumulate first in just one or a few fuel cells of the stack. The present invention relates to systems and methods for controlling operation of such a purge valve and operation of dead-ended fuel cell stacks.

In a first aspect a purge system for a fuel cell stack comprises a purge valve to regulate flow from a fuel cell stack, an actuator coupled to open and close the purge valve when the voltage across a purge cell portion of the fuel cell stack is less than defined threshold voltage based on the actual voltage of one or more cells in the stack. The system can include a purge cell voltage sensor coupled across at least one fuel cell forming a purge cell portion of the fuel cell stack to determine the voltage across the purge cell portion, a fuel cell voltage sensor coupled across at least two fuel cells in the fuel cell stack to determine the voltage across the fuel cells. A controller can be coupled to provide control signals to the actuator to open the purge valve when an average voltage across a purge cell portion of the fuel cell stack falls below a defined first percentage of a threshold voltage measured across the at least two fuel cells In another aspect a fuel cell system, comprises a fuel cell stack having a plurality of fuel cells, a purge valve to regulate a purge discharge from the fuel cell stack, an actuator coupled to open and close the purge valve, and a controller coupled to control the actuator to open and close the purge valve in a pulsed purge sequence when a fuel cell stack purge condition exists. A pulsed purge sequence can comprise opening the valve for a purge duration, then closing the purge valve for a hold period; repeating the opening and closing of the valve at least once, and then keeping the valve closed for an inter-purge duration before any subsequent purge. The inter-purge duration is typically longer than each of the at least one purge duration and hold period in the pulsed purge sequence.

In another aspect of a fuel cell system comprising a fuel cell stack having a plurality of fuel cells, a purge valve to regulate a purge discharge from the fuel cell stack, an actuator coupled to open and close the purge valve, and a controller coupled to provide control signals to the actuator to open the purge valve when a fuel cell stack purge condition exists, the controller is configured to close the purge valve after a purge duration which is determined based on a flow of current through the fuel cell stack.

In the foregoing aspects, the controller can be configured to determine if a stack purge condition exists, for example, by determining if an average purge cell voltage across a purge cell portion of a fuel cell stack exceeds a percentage of an average fuel cell voltage across at least a portion of the fuel cell stack.

A method of operating a fuel cell purge system with a pulsed purge sequence, comprises determining that a fuel cell stack purge condition exists and operating a purge valve in a pulsed sequence. The sequence can involve opening the valve for a purge duration, then closing the purge valve for a hold period; repeating the opening and closing of the valve at least once, and then keeping the valve closed for an inter-purge duration before any subsequent purge.

Another method of operating a fuel cell purge system comprises monitoring an average purge cell voltage across a purge cell portion of a fuel cell stack, monitoring an average fuel cell voltage across at least a portion of the fuel cell stack, and opening a purge valve if the average purge cell voltage falls below a first defined percentage of the average fuel cell voltage. The method can further comprise closing the purge valve when the average purge cell voltage rises above a second defined percentage of the average fuel cell voltage, which can be the same or different than the first percentage.

In another aspect, a method of operating a fuel cell purge system, comprises determining a current flow through a fuel cell stack, determining a purge duration based on the determined current flow, opening a purge valve coupled to the fuel cell stack, to discharge a depleted reactant stream from the fuel cell stack, and closing the purge valve after the purge valve has been open for the determined purge duration based on current flow.

In yet another aspect, a method of operating a fuel cell system, comprises opening a purge valve coupled to a purge cell portion of a fuel cell stack to exhaust a purge discharge for a startup purge duration during a starting state at a start of operation of the fuel cell system, and opening the purge valve for a shutdown purge duration during a stopping state at an end of operation of the fuel cell system. The purge valve can be opened for a determined purge duration during a purge cycle between the starting state and the stopping state during the operation of the fuel cell system, when a purge condition exists.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, have been selected solely for ease of recognition in the drawings.

DETAILED DESCRIPTION OF PREFERRED EMBODIMENTS

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
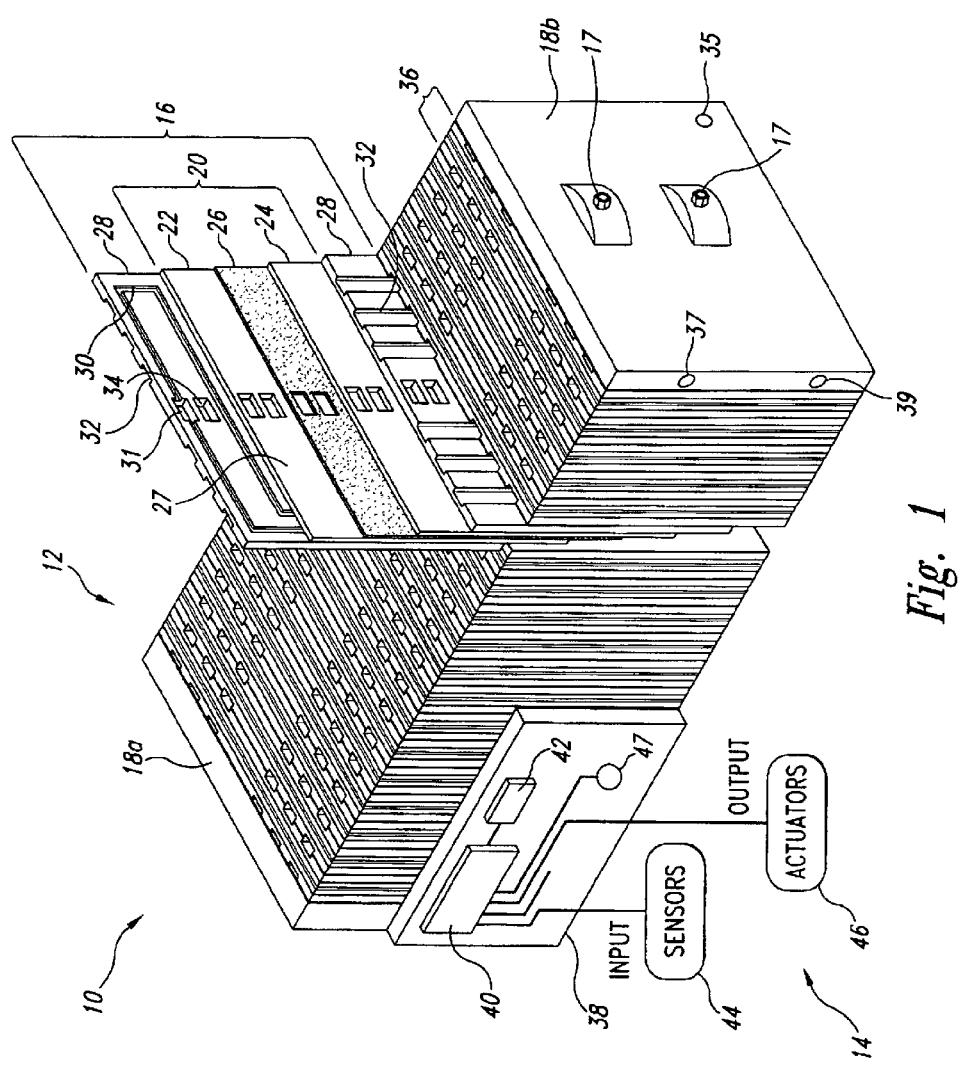
FIG. 1 is an isometric, partially exploded, view of a fuel cell system including a fuel cell stack and controlling electronics including a fuel cell monitoring and control system.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent the ion exchange membrane 26 with a catalyst 27, such as a thin layer of platinum, to render each electrode electrochemically active.

Fuel cell assembly 16 also includes a pair of separators or flow field plates 28 sandwiching membrane electrode assembly 20. In the illustrated embodiment, each of flow field plates 28 includes one or more reactant channels 30 formed on a planar surface of flow field plate 28 adjacent an associated one of electrodes 22, 24 for carrying fuel to anode 22 and oxidant to cathode 24, respectively. (Reactant channel 30 on only one of flow field plates 28 is visible in FIG. 1.) Reactant channels 30 that carry the oxidant also carry exhaust air and product water away from cathode 24. As will be described in more detail below, fuel stack 12 is designed to operate in a dead-ended fuel mode, thus substantially all of the hydrogen fuel supplied to it during operation is consumed, and little if any hydrogen is carried away from stack 12 in normal operation of system 10. In the illustrated embodiment, each flow field plate 28 preferably includes a plurality of cooling channels 32 formed on the planar surface of the flow field plate 28 opposite the planar surface having reactant channel 30. When the stack is assembled, the cooling channels 32 of each adjacent fuel cell assembly 16 cooperate so that closed cooling channels 32 are formed between each membrane electrode assembly 20. Cooling channels 32 transmit cooling air through fuel cell stack 12. Cooling channels 32 are preferably straight and parallel to each other, and traverse each plate 28 so that cooling channel inlets and outlets are located at respective edges of plate 28.

While the illustrated embodiment includes two flow field plates 28 in each fuel cell assembly 16, other embodiments can include a single bipolar flow field plate (not shown) between adjacent membrane electrode assemblies 20. In such embodiments, a channel on one side of the bipolar plate carries fuel to the anode of one adjacent membrane electrode assembly 20, while a channel on the other side of the plate carries oxidant to the cathode of another adjacent membrane electrode assembly 20. In such embodiments, additional flow field plates 28 having channels for carrying coolant (e.g., liquid or gas, such as cooling air) can be spaced throughout fuel cell stack 12, as needed to provide sufficient cooling of stack 12.

End plate 18*a* includes a fuel stream inlet port (not shown) for introducing a supply fuel stream into fuel cell stack 12. End plate 18*b* includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a purge valve at the fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

The end plate 18*b* includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. Oxidant inlet port 37 is fluidly connected to the oxidant outlet port 39 via respective reactant channels 30 that are in fluid communication with oxidant supply and exhaust manifolds, respectively.

In one embodiment, fuel cell stack 12 includes forty-seven fuel cell assemblies 16. (FIGS. 1 and 2 omit a number of the fuel cell assemblies 16 to enhance drawing clarity). Fuel cell stack 12 can include a greater or lesser number of fuel cell assemblies to provide more or less power, respectively.

Figure 2:
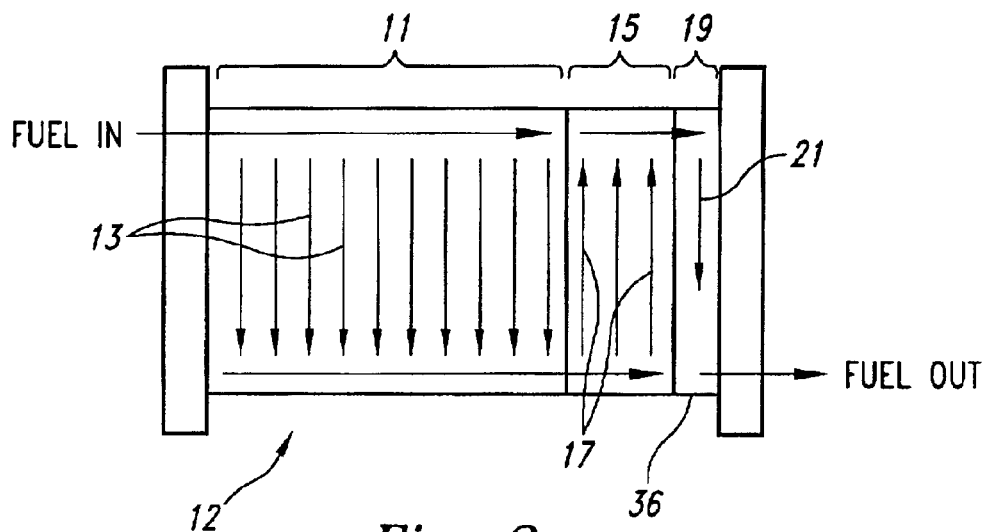
FIG. 2 is a schematic diagram representing fuel flow through a cascaded fuel cell stack of the fuel cell system of FIG. 1.

As shown in FIG. 2, fuel is directed through fuel cell stack 12 in a cascaded flow pattern. A first set 11 composed of the first forty-three fuel cell assemblies 16 are arranged so that fuel flows within the set in a concurrent parallel direction (represented by arrows 13) that is generally opposite the direction of the flow of coolant through fuel cell stack 12. Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21), generally opposite the flow of coolant through fuel cell stack 12. The oxidant is supplied to each of the forty-seven fuel cells in parallel, in the same general direction as the flow of coolant through fuel cell stack 12.

The final set 19 of fuel cell assemblies 16 comprises the purge cell portion 36 of the fuel cell stack. The purge cell portion 36 accumulates non-reactive components which are periodically vented by opening a purge valve.

Each membrane electrode assembly 20 is designed to produce a nominal potential difference of about 0.6 V between anode 22 and cathode 24. Reactants (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Fuel Cell System Sensors and Actuators

With continuing reference to FIG. 1, electronic monitoring and control system 14 comprises various electrical and electronic components on a circuit board 38 and various sensors 44 and actuators 46 distributed throughout fuel cell system 10. Circuit board 38 carries a microprocessor or microcontroller 40 that is appropriately programmed or configured to carry out fuel cell system operation. Microcontroller 40 can take the form of an Atmel AVR RISC microcontroller available from Atmel Corporation of San Jose, Calif. Electronic fuel cell monitoring and control system 14 also includes a persistent memory 42, such as an EEPROM portion of microcontroller 40 or discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic fuel cell monitoring and control system 14 until fuel cell stack 12 can provide sufficient power to the electronic monitoring and control system 14. Microcontroller 40 is selectively couplable between fuel cell stack 12 and battery 47 for switching power during fuel cell system operation and/or to recharge battery 47 during fuel cell operation.

Figure 3:
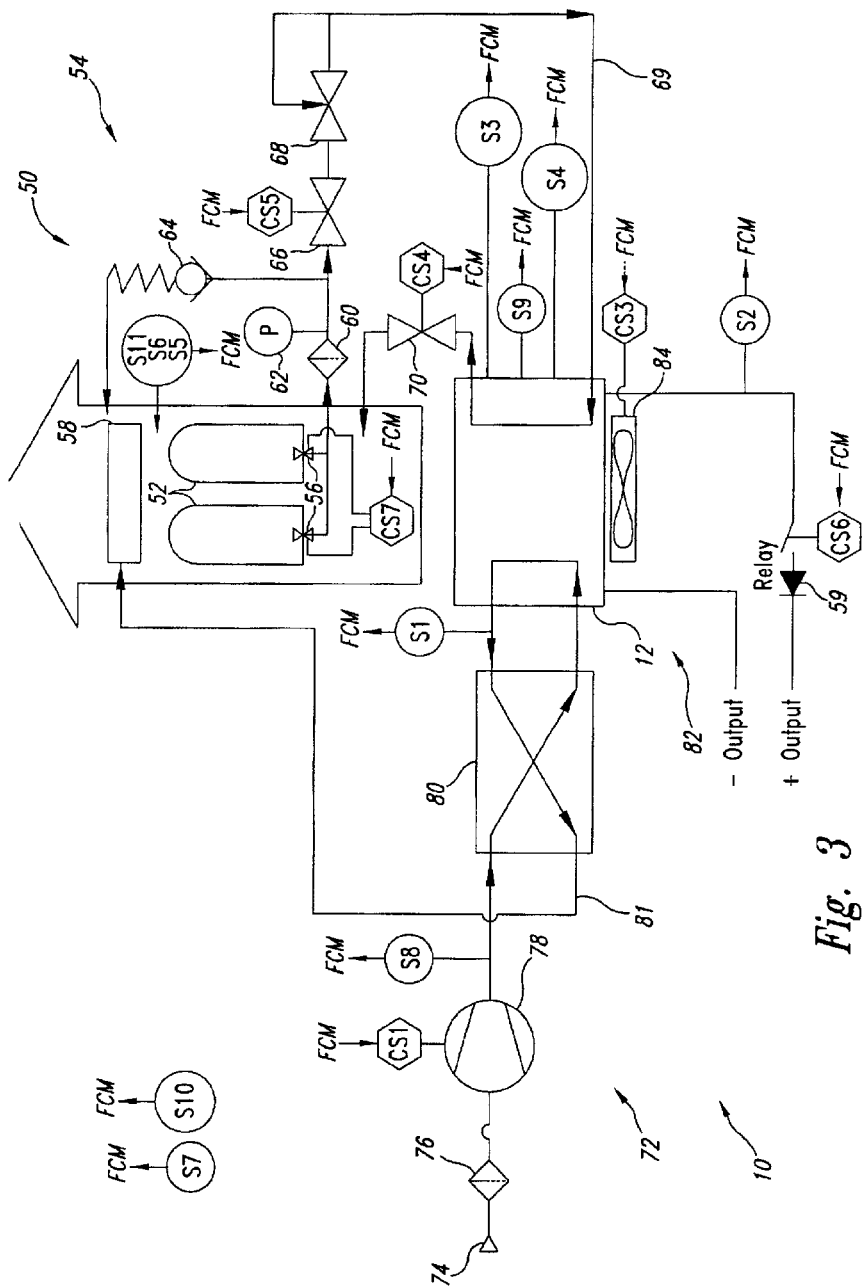
FIG. 3 is a schematic diagram of a portion of the fuel cell monitoring and control system of FIG. 1.

FIG. 3 show various elements of fuel cell system 10 in further detail, and shows various other elements that were omitted from FIG. 1 for clarity of illustration.

With particular reference to FIG. 3, fuel cell system 10 provides fuel (e.g., hydrogen) to the anode 22 by way of a fuel system 50. The fuel system 50 includes a source of fuel such as one or more fuel tanks 52, and a fuel regulating system 54 for controlling delivery of the fuel. Fuel tanks 52 can contain hydrogen, or some other fuel such as methanol. Alternatively, fuel tanks 52 can represent a process stream from which hydrogen can be derived by reforming, such as methane or natural gas (in which case a reformer is provided in fuel cell system 10).

Fuel tanks 52 each include a fuel tank valve 56 for controlling the flow of fuel from respective fuel tank 52. Fuel tank valves 56 may be automatically controlled by microcontroller 40, and/or manually controlled by a human operator. Fuel tanks 52 may be refillable, or may be disposable. Fuel tanks 52 may be integral to fuel system 50 and/or fuel cell system 10, or can take the form of discrete units. In this embodiment, fuel tanks 52 are hydride storage tanks. Fuel tanks 52 are positioned within fuel cell system 10 such that they are heatable by exhaust cooling air warmed by heat generated by fuel cell stack 12. Such heating facilitates the release of hydrogen from the hydride storage media.

Fuel cell monitoring and control system 14 includes a hydrogen concentration sensor S5, hydrogen heater current sensor S6 and a hydrogen sensor check sensor S11. Hydrogen heater current sensor S6 can take the form of a current sensor that is coupled to monitor a hydrogen heater element that is an integral component of hydrogen concentration sensor S5. Hydrogen sensor check sensor S11 monitors voltage in a hydrogen concentration sensor S5, discussed below, to determine whether hydrogen concentration sensor S5 is functioning.

Fuel tanks 52 are coupled to the fuel regulating system 54 through a filter 60 that ensures that particulate impurities do not enter fuel regulating system 54. Fuel regulating system 54 includes a pressure sensor 62 to monitor the pressure of fuel in fuel tanks 52, which indicates how much fuel remains in fuel tanks 52. A pressure relief valve 64 automatically operates to relieve excess pressure in fuel system 50. Pressure relief valve 64 can take the form of a spring and ball relief valve. A main gas valve solenoid CS5 opens and closes a main gas valve 66 in response to signals from microcontroller 40 to provide fluid communication between fuel tanks 52 and fuel regulating system 54. Additional solenoids CS7 control flow through the fuel tank valves 56. A hydrogen regulator 68 regulates the flow of hydrogen from fuel tanks 52. Fuel is delivered to the anodes 22 of the fuel cell assemblies 16 through a hydrogen inlet conduit 69 that is connected to fuel stream inlet port of stack 12.

Sensors 44 of fuel regulating system 54 monitor a number of fuel cell system operating parameters to maintain fuel cell system operation within acceptable limits. For example, a stack voltage sensor S3 measures the gross voltage across fuel cell stack 12. A purge cell voltage sensor S4 monitors the voltage across purge cell portion 36 (the final set 19 of fuel cell assemblies 16 in cascaded design of FIG. 2). A cell voltage checker S9 ensures that a voltage across each of the fuel cells 20 is within an acceptable limit. Each of the sensors S3, S4, S9 provide inputs to microcontroller 40, identified in FIG. 3 by arrows pointing toward the blocks labeled "FCM" (i.e., fuel cell microcontroller 40).

A fuel purge valve 70 is provided at the fuel stream outlet port 35 of fuel cell stack 12 and is typically in a closed position when stack 12 is operating. Fuel is thus supplied to fuel cell stack 12 only as needed to sustain the desired rate of electrochemical reaction. Because of the cascaded flow design, any impurities (e.g. nitrogen) in the supply fuel stream tend to accumulate in purge cell portion 36 during operation. A build-up of impurities in purge cell portion 36 tends to reduce the performance of purge cell portion 36; should the purge cell voltage sensor S4 detect a performance drop below a threshold voltage level, microcontroller 40 may send a signal to a purge valve controller CS4 such as a solenoid to open the purge valve 36 and discharge the impurities and other non-reactive components that may have accumulated in purge cell portion 36 (collectively referred to as "purge discharge"). The venting of hydrogen during a purge is appropriately limited, to prevent the monitoring and control systems, discussed below, from triggering a failure or fault.

Fuel cell system 10 provides oxygen in an air stream to the cathode side of membrane electrode assemblies 20 by way of an oxygen delivery system 72. A source of oxygen or air 74 can take the form of an air tank or the ambient atmosphere. A filter 76 ensures that particulate impurities do not enter oxygen delivery system 72. An air compressor controller CS1 controls an air compressor 78 to provide the air to fuel cell stack 12 at a desired flow rate. A mass air flow sensor S8 measures the air flow rate into fuel cell stack 12, providing the value as an input to microcontroller 40. A humidity exchanger 80 adds water vapor to the air to keep the ion exchange membrane 26 moist. Humidity exchanger 80 also removes water vapor which is a byproduct of the electrochemical reaction. Excess liquid water is provided to an evaporator 58 via conduit 81.

Fuel cell system 10 removes excess heat from fuel cell stack 12 and uses the excess heat to warm fuel in fuel tanks 52 by way of a cooling system 82. Cooling system 82 includes a fuel cell temperature sensor S1, for example a thermister that monitors the core temperature of fuel cell stack 12. The temperature is provided as input to microcontroller 40. A stack current sensor S2, for example a Hall sensor, measures the gross current through fuel cell stack 12, and provides the value of the current as an input to microcontroller 40. A cooling fan controller CS3 controls the operation of one or more cooling fans 84 for cooling fuel cell stack 12. After passing through fuel cell stack 12, the warmed cooling air circulates around fuel tanks 52 to warm the fuel. The warmed cooling air then passes through the evaporator 58. A power relay controller CS6 such as a solenoid connects, and disconnects, the fuel cell stack to, and from, an external circuit in response to microcontroller 40. A power diode 59 provides one-way isolation of fuel cell system 10 from the external load to provide protection to fuel cell system 10 from the external load. A battery relay controller CS8 connects, and disconnects, fuel cell monitoring and control system 14 between fuel cell stack 12 and battery 47.

The fuel cell monitoring and control system 14 (illustrated in FIG. 4) includes sensors for monitoring fuel cell system 10 surroundings and actuators for controlling fuel cell system 10 accordingly. For example, a hydrogen concentration sensor S5 (shown in FIG. 3) for monitoring the hydrogen concentration level in the ambient atmosphere surrounding fuel cell stack 12. The hydrogen concentration sensor S5 can take the form of a heater element with a hydrogen sensitive thermister that may be temperature compensated. An oxygen concentration sensor S7 (illustrated in FIG. 4) to monitor the oxygen concentration level in the ambient atmosphere surrounding fuel cell system 10. An ambient temperature sensor S10 (shown in FIG. 3), for example a digital sensor, to monitor the ambient air temperature surrounding fuel cell system 10.

Figure 4:
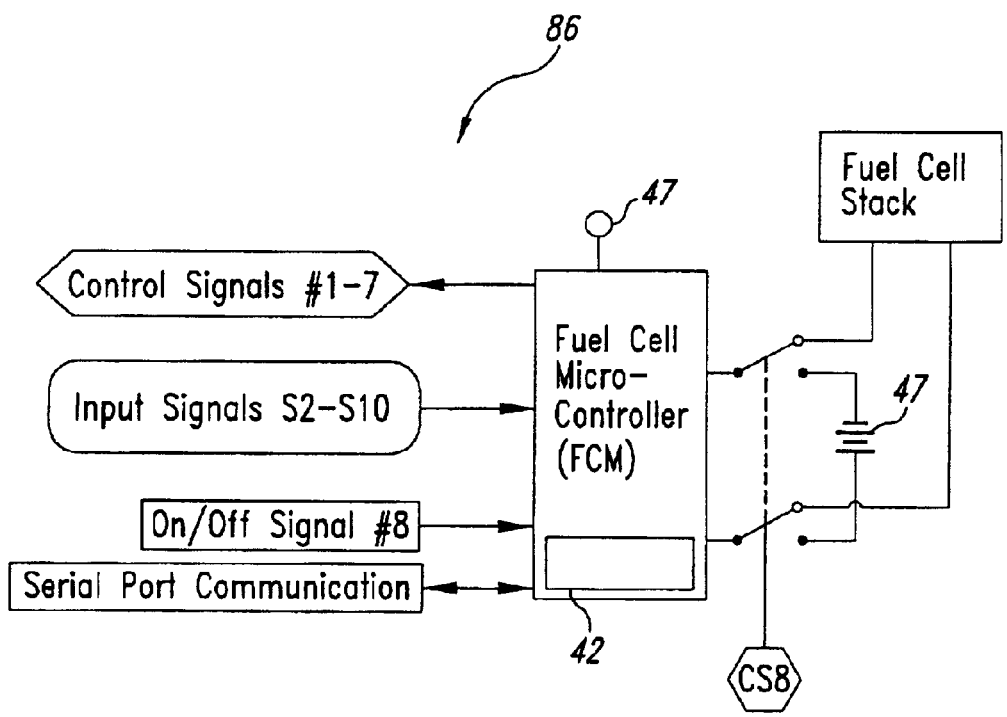
FIG. 4 is a schematic diagram of an additional portion of the fuel cell monitoring and control system of FIG. 3, including a fuel cell microcontroller selectively coupled between the fuel cell stack and a battery.

With reference to FIG. 4, microcontroller 40 receives the various sensor measurements such as ambient air temperature, fuel pressure, hydrogen concentration, oxygen concentration, fuel cell stack current, air mass flow, cell voltage check status, voltage across the fuel cell stack, and voltage across the purge cell portion of the fuel cell stack from various sensors described below. Microcontroller 40 provides the control signals to the various actuators, such as air compressor controller CS1, cooling fan controller CS3, purge valve controller CS4, main gas valve solenoid CS5, power circuit relay controller CS6, hydride tank valve solenoid CS7, and battery relay controller CS8.

Fuel Cell System Structural Arrangement

FIGS. 5–8 illustrate the structural arrangement of the components in fuel cell system 10. For convenience, "top", "bottom", "above", "below" and similar descriptors are used merely as points of reference in the description, and while corresponding to the general orientation of fuel cell system 10 during operation, are not to be construed to limit the orientation of fuel cell system 10 during operation or otherwise.

Figure 5:
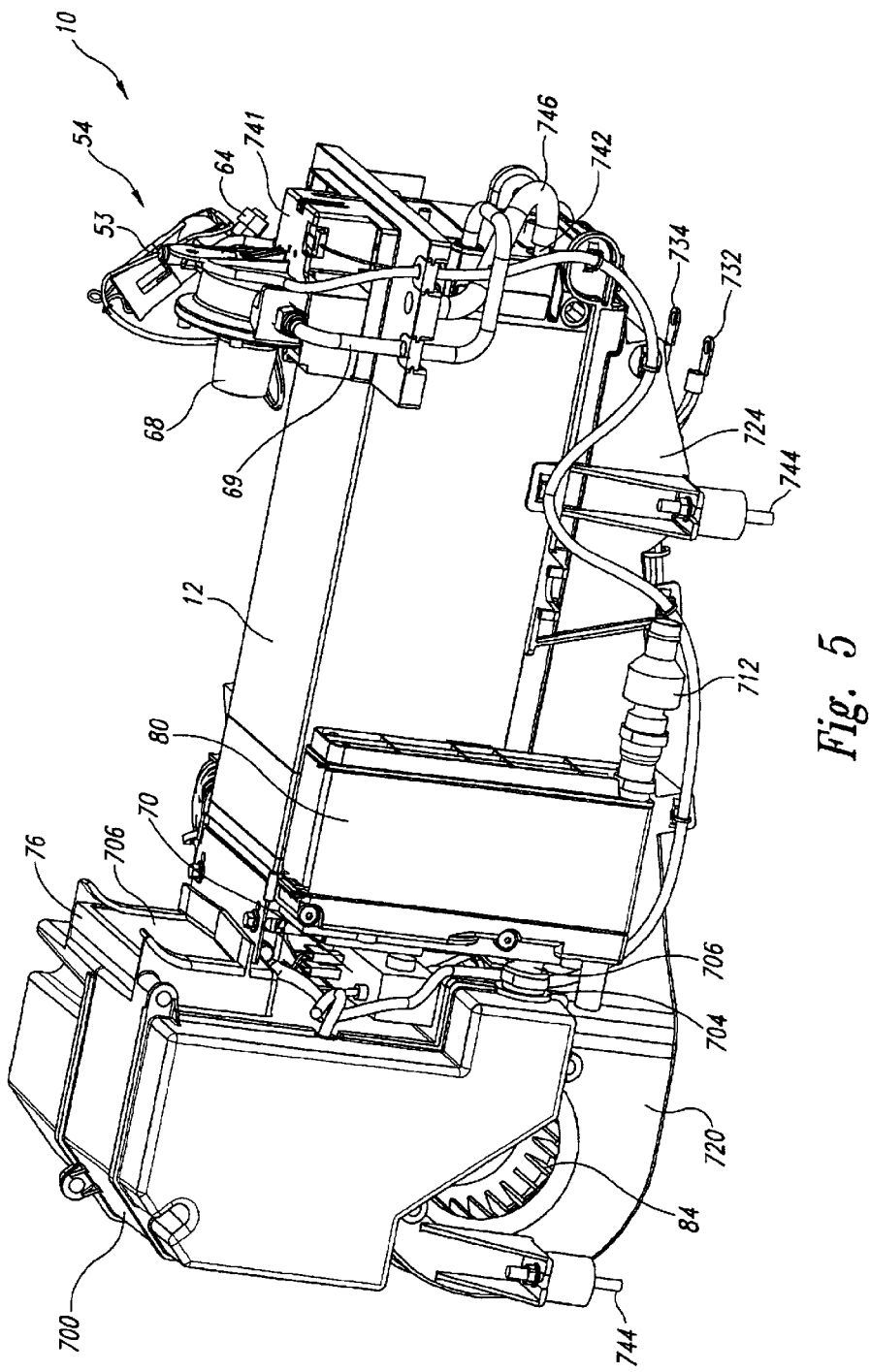
FIG. 5 is a top, right isometric view of a structural arrangement of various components of the fuel cell system of FIG. 1.
Figure 6:
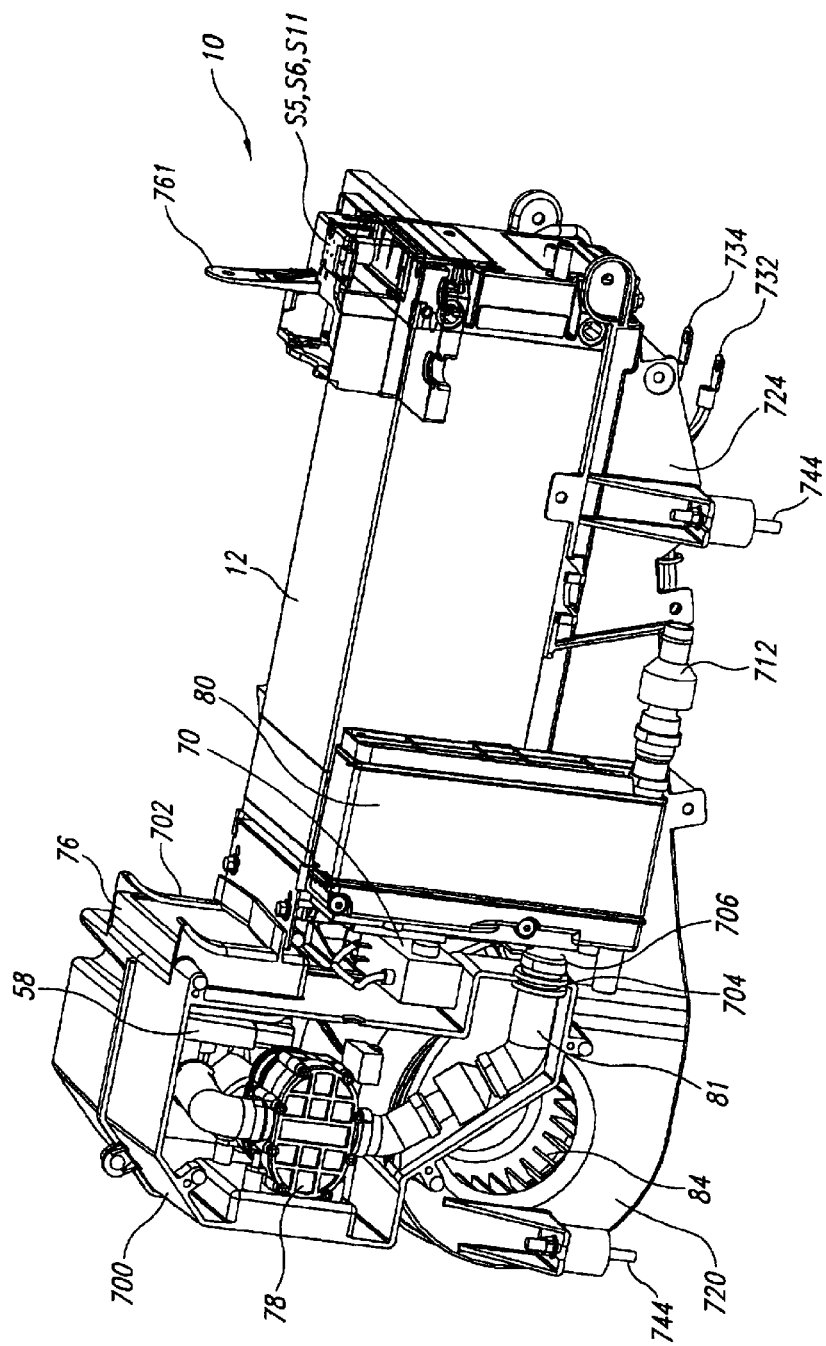
FIG. 6 is a top, right isometric view of the structural arrangement of various components of the fuel cell system of FIG. 5 with a cover removed.
Figure 7:
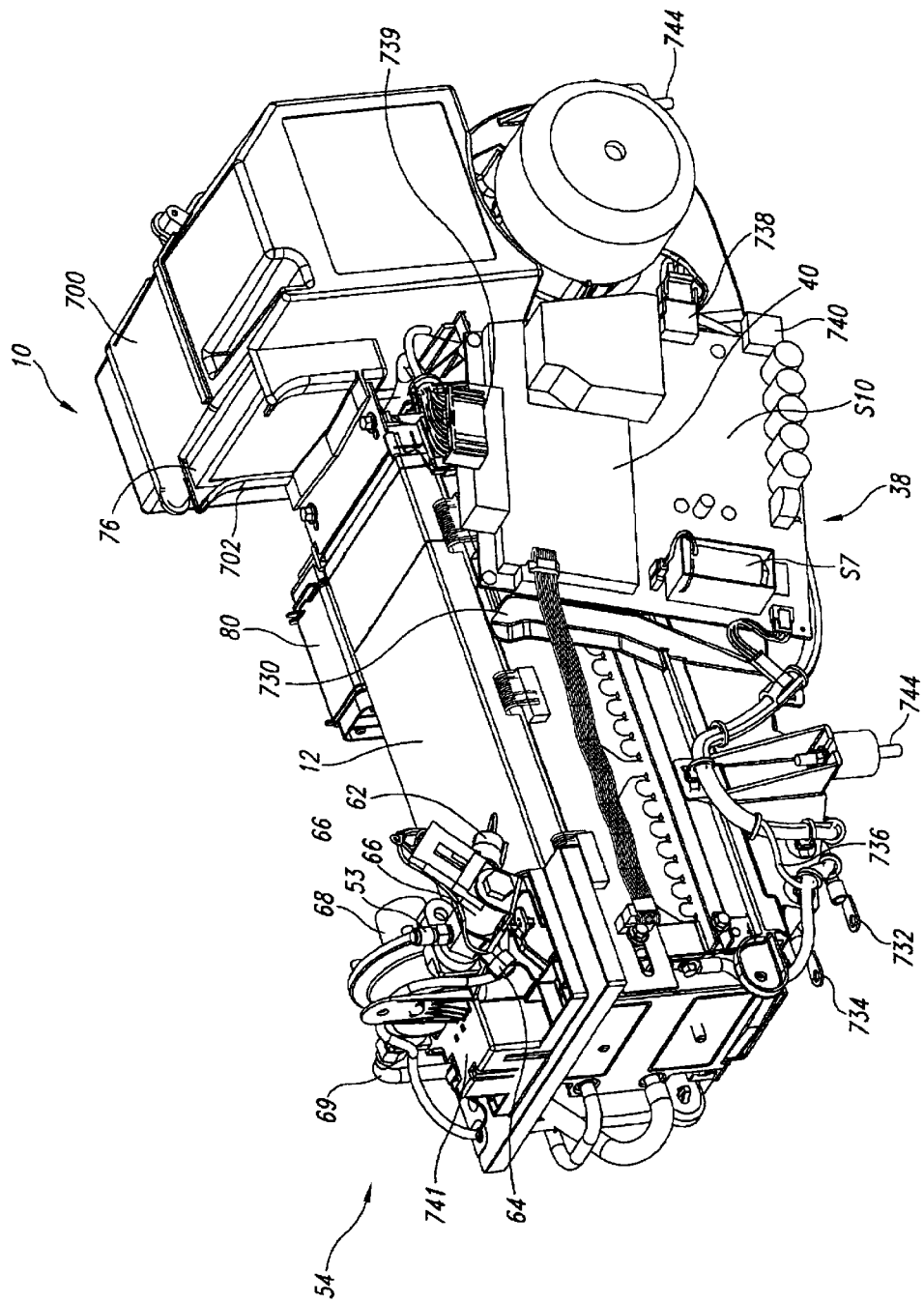
FIG. 7 is top, left isometric view of the structural arrangement of various components of the fuel cell system of FIG. 5.

Referring to FIGS. 5–7, air compressor 78 and cooling fan 84 are grouped together at one end ("air supply end") of fuel cell stack 12. Fuel tanks 52 (not shown in FIGS. 5–7) are mountable to fuel cell system 10 on top of, and along the length of, fuel cell stack 12. The components of fuel regulating system 54 upstream of fuel cell stack 12 are located generally at the end of stack 12 ("hydrogen supply end") opposite the air supply end.

Air compressor 78 is housed within an insulated housing 700 that is removably attached to fuel cell stack 12 at the air supply end. Housing 700 has an air supply aperture 702 covered by the filter 76 that allows supply air into housing 700. Air compressor 78 is a positive displacement low pressure type compressor and is operable to transmit supply air to air supply conduit 81 at a flow rate controllable by the operator. An air supply conduit 81 passes through a conduit aperture 704 in compressor housing 700 and connects with an air supply inlet 706 of humidity exchanger 80. Mass flow sensor S8 is located on the air supply conduit 81 upstream of the humidity exchanger 81 and preferably within the compressor housing 700.

Humidity exchanger 80 may be of the type disclosed in U.S. Pat. No. 6,106,964, and is mounted to one side of fuel cell stack 12 near the air supply end. Air entering into humidity exchanger 80 via air supply conduit 81 is humidified and then exhausted from humidity exchanger 80 and into fuel cell stack 12 (via the supply air inlet port of the end plate 18b). Exhaust air from fuel cell stack 12 exits via the exhaust air outlet port in end plate 18b and into humidity exchanger 80, where water in the air exhaust stream is transferred to the air supply stream. The air exhaust stream then leaves humidity exchanger 80 via the air exhaust outlet 712 and is transmitted via an air exhaust conduit (not shown) to the evaporator 58 (not shown in FIGS. 5–7) mountable to a cover (not shown) above fuel cell stack 12.

Cooling fan 84 is housed within a fan housing 720 that is removably mounted to the air supply end of fuel cell stack 12 and below the compressor housing 700. Fan housing 720 includes a duct 724 that directs cooling air from cooling fan 84 to the cooling channel openings at the bottom of fuel cell stack 12. Cooling air is directed upwards and through fuel cell stack 12 via the cooling channels 32 and is discharged from the cooling channel openings at the top of fuel cell stack 12. During operation, heat extracted from fuel cell stack 12 by the cooling air is used to warm fuel tanks 52 that are mountable directly above and along the length of stack 12. Some of the warmed cooling air can be redirected into the air supply aperture 702 of the compressor housing 700 for use as oxidant supply air.

Referring particularly to FIG. 7, circuit board 38 carrying microcontroller 40, oxygen sensor S7 and ambient temperature sensor S10 is mounted on the side of fuel cell stack 12 opposite humidity exchanger 80 by way of a mounting bracket 330. Positive and negative electrical power supply lines 732, 734 extend from each end of fuel cell stack 12 and are connectable to an external load. An electrically conductive bleed wire 736 from each of the power supply lines 732, 734 connects to circuit board 38 at a stack power in terminal 738 and transmits some of the electricity generated by fuel cell stack 12 to power the components on circuit board 38, as well as sensors 44 and actuators 46 which are electrically connected to circuit board 38 at terminal 739. Similarly, battery 47 (not shown in FIGS. 5–7) is electrically connected to circuit board 38 at battery power in terminal 740. Battery 47 supplies power to the circuit board components, sensors 44 and actuators 46 when fuel cell stack output has not yet reached nominal levels (e.g, at start-up); once fuel cell stack 12 has reached nominal operating conditions, fuel cell stack 12 can also supply power to recharge battery 47.

Figure 8:
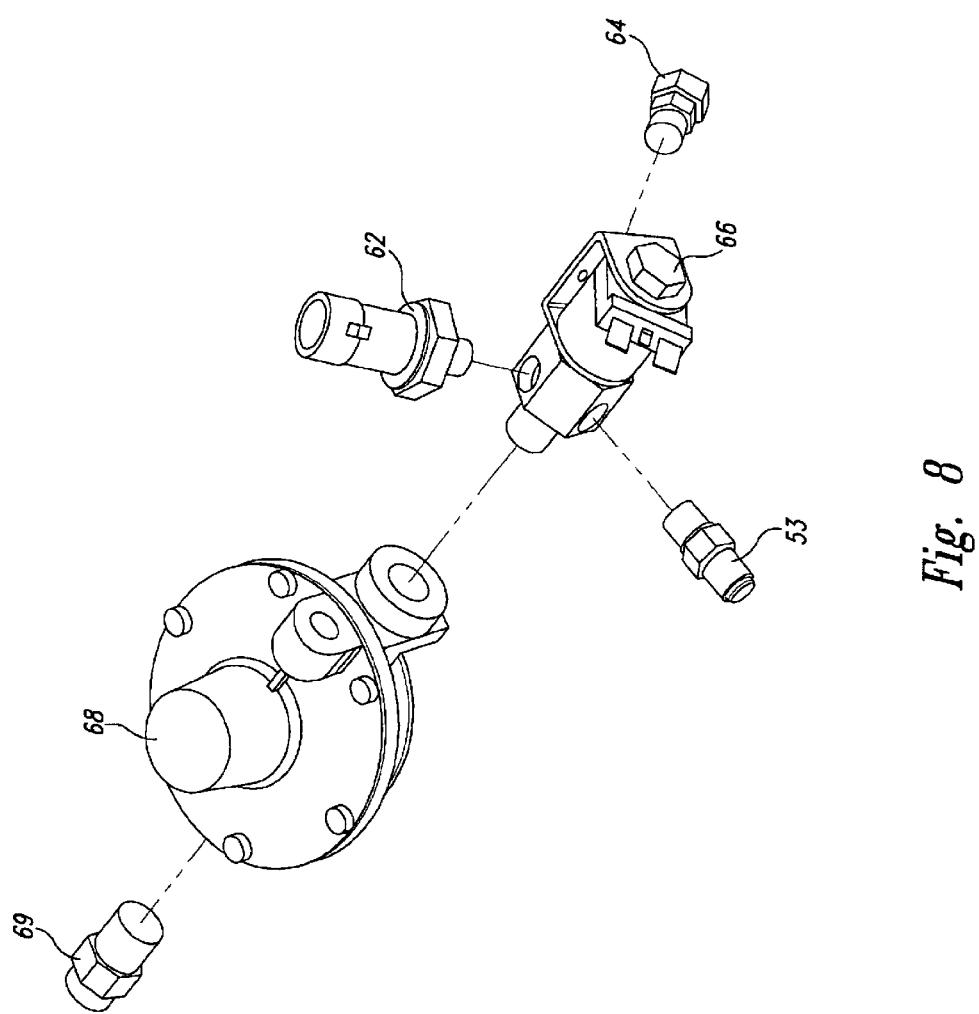
FIG. 8 is a top, right isometric view of a pressure regulator portion of the fuel cell system of FIG. 5.

Referring generally to FIGS. 5–7 and particularly to FIG. 8, a bracket 741 is provided at the hydrogen supply end for the mounting of a fuel tank valve connector 53, hydrogen pressure sensor 62, pressure relief valve 64, main gas valve 66, and hydrogen pressure regulator 68 above fuel cell stack 12 at the hydrogen supply end. A suitable pressure regulator may be a Type 912 pressure regulator available from Fisher Controls of Marshalltown, Iowa. A suitable pressure sensor may be a transducer supplied Texas Instruments of Dallas, Tex. A suitable pressure relief valve may be supplied by Schraeder-Bridgeport of Buffalo Grove, Ill. The pressure relief valve 64 is provided for the fuel tanks 52 and may be set to open at about 350 psi. A low pressure relief valve 742 is provided for fuel cell stack 12. Bracket 741 also provides a mount for hydrogen concentration sensor S5, hydrogen heater current sensor S6 and hydrogen sensor check sensor S11, which are visible in FIG. 6 in which the bracket 741 is transparently illustrated in hidden line. Fuel tanks 52 are connectable to the fuel tank connector 53. When the fuel tank and main gas valves 56, 66 are opened, hydrogen is supplied under a controlled pressure (monitored by pressure sensor 62 and adjustable by hydrogen pressure regulator 68) through the fuel supply conduit 69 to the fuel inlet port of end plate 18a. The purge valve 70 is located at the fuel outlet port at end plate 18b.

Fuel cell system 10 and fuel tanks 52 are coupled to a base (not shown) at mounting points 744 and housed within a fuel cell system cover (not shown). Cooling air exhausted from the top of fuel cell stack 12 is thus directed by the cover either to the supply air inlet 702 or over fuel regulating system 54 to a cooling air discharge opening in the housing.

Fuel cell system 10 is designed so that the components that are designed to discharge hydrogen or that present a risk of leaking hydrogen, are as much as practical, located in the cooling air path or have their discharge/leakage directed to the cooling air path. The cooling air path is defined by duct 724, cooling air channels of stack 12, and the portion of the system cover above stack 12. The components directly in the cooling air path include fuel tanks 52, and components of fuel regulating system 54 such as pressure relief valve 64, main gas valve 66, and hydrogen regulator 68. Components not directly in the cooling air path are fluidly connected to the cooling air path, and include valve 70 connected to duct 724 via purge conduit (not shown) and low pressure relief valve 742 connected to an outlet near fuel regulating system 54 via conduit 746. When cooling air fan 84 is operational, the cooling air stream carries leaked/discharged hydrogen through duct 724, past stack 12, and out of system 10. Hydrogen concentration sensor S5 is strategically placed as far downstream as possible in the cooling air stream to detect hydrogen into the cooling air. Hydrogen concentration sensor S5 is also placed in the vicinity of the components of fuel regulating system 54 to improve detection of hydrogen leaks/discharges from fuel regulating system 54.

Exemplary Method of Operation

Fuel cell system 10 can employ a number of operating states that may determine which operations or tasks microcontroller 40 executes, and may determine the response of microcontroller 40 to various readings or measurements of the fuel cell system operating parameters. Microcontroller 40 executes software that can be programmed into and executed from an on-chip flash memory of microcontroller 40 or in other controller-readable memory. In particular, fuel cell system 10 can employ a standby state, starting state, running state, warning state, failure state, and stopping state.

In a standby state fuel cell stack 12 is not operating and microcontroller 40 monitors a startline for a startup signal. For example, operator activation of a start button or switch (not shown) can generate the startup signal on the startup line.

In a starting state, microcontroller 40 initializes itself, places all actuators and control devices in their proper initial states, enables a serial interface, starts a watchdog timer, and performs a series of checks to ensure that all systems and components are operational. If the outcomes of the checks are satisfactory, microcontroller 40 causes the external load to be connected and enters the running state, otherwise fuel cell system 10 enters the failure state without becoming operational.

In a running state, fuel and oxidant are supplied to the fully operational fuel cell stack 12. Microcontroller 40 monitors the performance of fuel cell system 10 based on the measured operating parameters, and controls the various systems via the various actuators discussed above. If microcontroller 40 determines that one or more operating parameters are outside of a warning range, microcontroller 40 places fuel cell system 10 into the warning state. If microcontroller 40 determines that one or more operating parameters are outside of a failure range, microcontroller 40 places the fuel cell system into the failure state. Otherwise, fuel cell system 10 continues in a running state until a stop signal is received on the startup line. In response to the stop signal, microcontroller 40 advances fuel cell system 10 from a running state to a stopping state if fuel cell system 10 has been in a running state for at least one minute. If so, the microcontroller 40 begins an extended shutdown procedure lasting approximately 45 seconds, during which time the fuel cell system 12 is in a stopping state. If not, microcontroller 40 engages the normal shutdown procedure and fuel cell system 10 proceeds directly from a running state to a standby state.

In a warning state, microcontroller 40 can provide a warning notification of the out-of-warning range condition to the operator, but otherwise fuel cell system 10 continues to operate. Additionally, microcontroller 40 can write a warning condition code corresponding to the out-of-warning range condition to the persistent memory 42.

In a failure state, microcontroller 40 immediately stops operation of fuel cell system 10 and writes a fault condition code to the persistent memory 42. Fuel cell system 10 remains in a failure state until a stop signal is received on the startline. In response to the stop signal, microcontroller 40 completes the shut down of fuel cell system 10 and places fuel cell system 10 into a standby state.

In a stopping state, microcontroller 40 shuts down the various components of fuel cell system 10, stopping operation of fuel cell system 10, Once the various components have been shut down, microcontroller 40 places fuel cell system 10 into a standby state.

Figure 9:
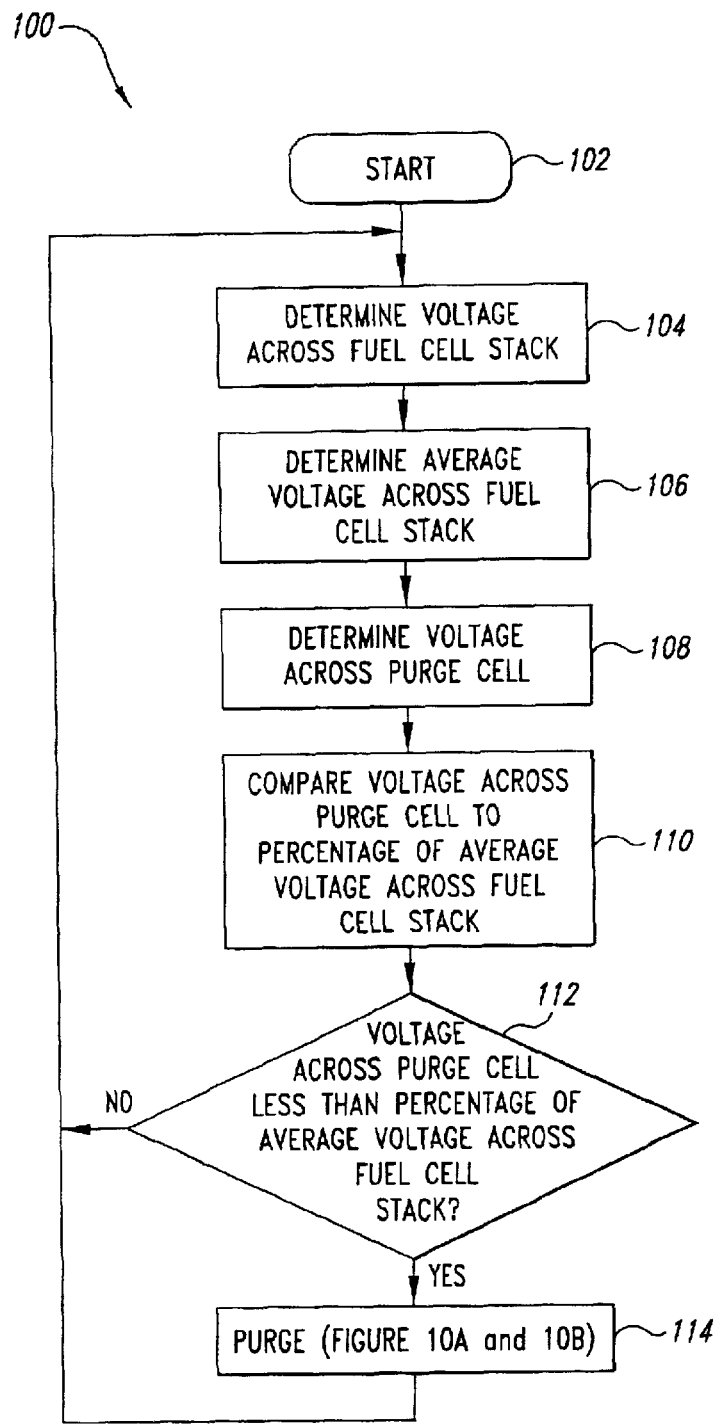
FIG. 9 is a flow diagram showing a method of operation for monitoring a fuel cell system and determining when to purge the fuel cell stack.

FIG. 9 shows an exemplary method 100 of determining when to purge fuel cell stack 12 of fuel cell system 10, starting in step 102. In step 104, microcontroller 40 determines the voltage across the fuel cell stack 10. Microcontroller 40 may receive the stack voltage measurement from the stack voltage sensor S3. Alternatively, microcontroller 40 may rely on the voltage across a lesser number of fuel cell assemblies 16 in stack 12. In step 106, microcontroller 40 determines the average individual cell voltage across the fuel cell stack 10. Microcontroller 40 may divide the voltage across the fuel cell stack 10 determined in step 104 by the number of fuel cells 20 in fuel cell stack 12 to determine the average individual cell voltage.

In step 108, microcontroller 40 determines the voltage across the purge cell portion 36. Microcontroller 40 may receive the purge cell voltage reading from purge cell voltage sensor S4. In step 110, microcontroller 40 compares the average individual cell voltage across the purge cell portion 36 to a defined or selected percentage of the average cell voltage for the fuel cell stack 12 determined in step 106. A suitable percentage may be approximately 90%. Where the purge cell portion 36 includes more than one fuel cell assembly 16, microcontroller 40 can determine the average of the total voltage across the fuel cell assemblies constituting the purge cell portion 36. Thus, microcontroller 40 compares the average cell voltage across a fuel cell assembly 16 in the purge cell portion to a defined percentage of the average cell voltage across fuel cell assemblies 16 in the at least a portion of fuel cell stack 12 (for example, the average cell voltage could be of the entire stack, of the remainder of the stack not including the purge cell portion, or of one or more cells in the stack). A significant drop in the voltage across one or more fuel cell assemblies 16 constituting the purge cell portion 36 with respect to the voltage across the other fuel cell assemblies 16 of stack 12 indicates an accumulation of non-reactive components in the fuel passages of purge cell portion 36.

In step 112, microcontroller 40 passes control to step 114 to execute a purge of fuel cell stack 12 if the average cell voltage in the purge cell portion 36 falls below the defined percentage of the average cell voltage for the fuel cell stack 12. If the average cell voltage in the purge cell is not less than the defined percentage of the average cell voltage for fuel cell stack 12, microcontroller 40 returns control to step 104 to continue monitoring the voltages.

Figure 10A:
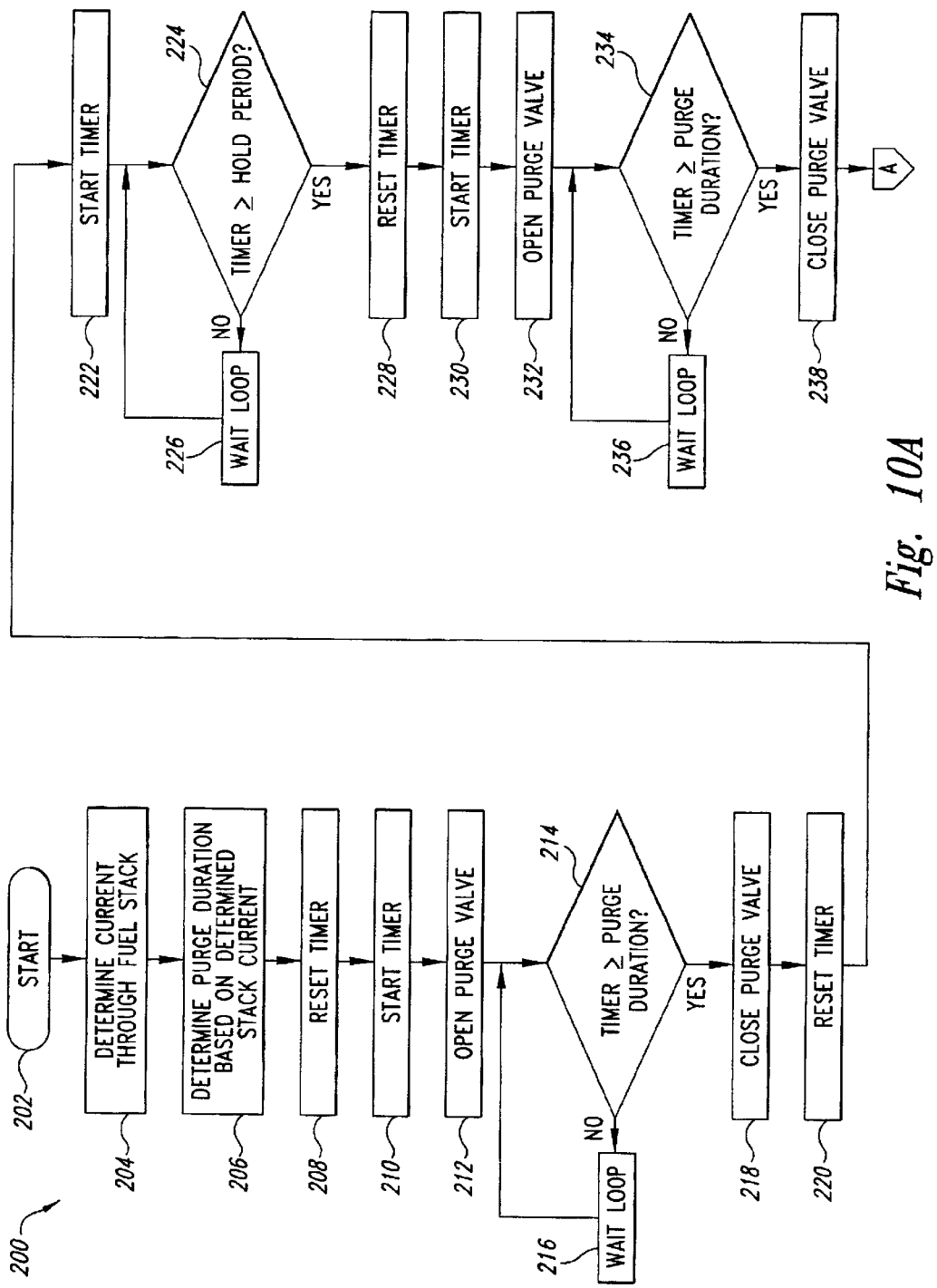
FIG. 10A and 10B combined are a flow diagram of a method of operation for a fuel cell system showing a method of purging the fuel cell stack for a purge duration.
Figure 10B:
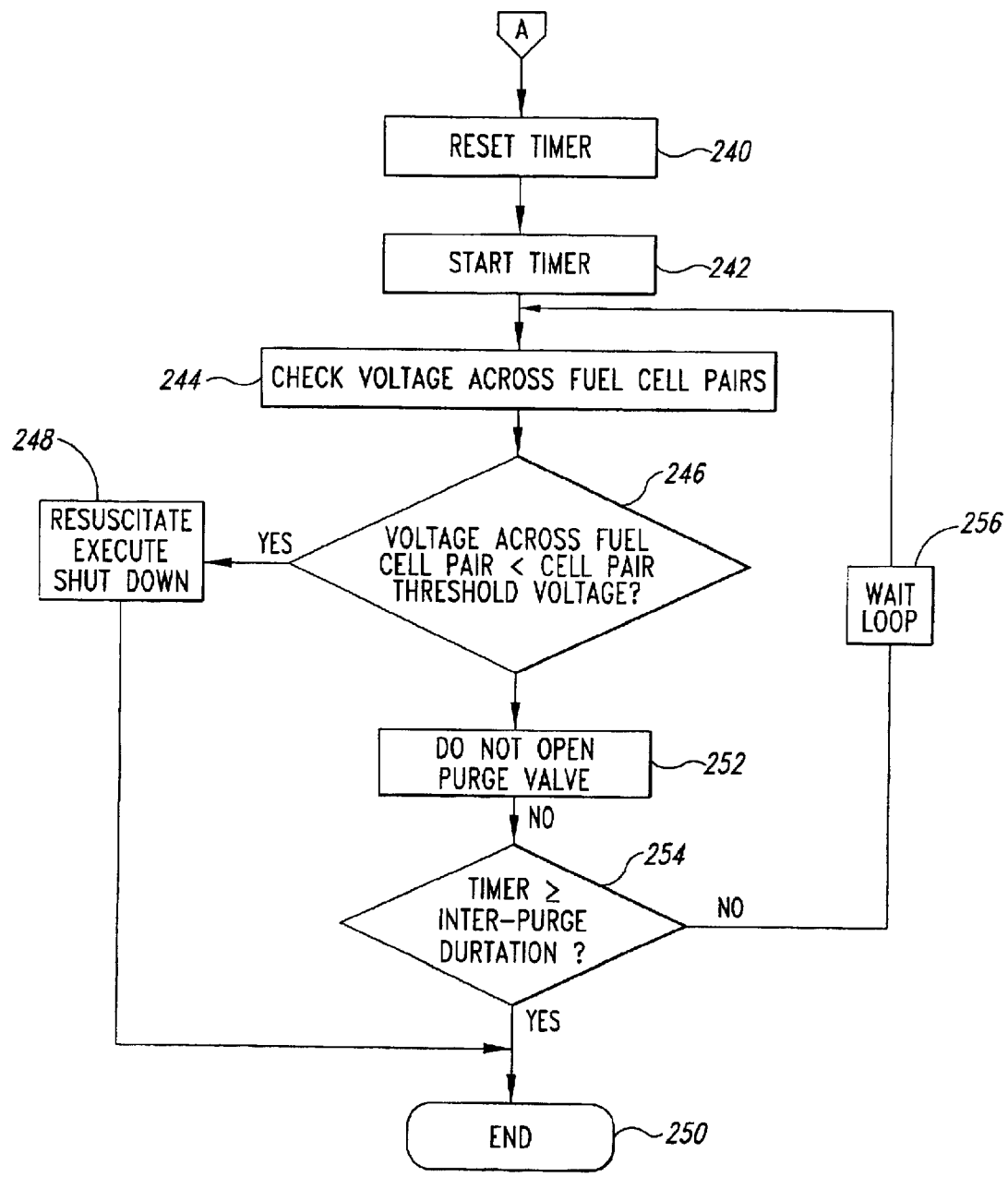

FIGS. 10A and 10B combined show an exemplary method 200 of purging fuel cell stack 12, starting in step 202.

In optional step 204, microcontroller 40 determines the current through fuel cell stack 12. Microcontroller 40 can receive the stack current measurement from the fuel stack current sensor S2. In optional step 206, microcontroller 40 can determine the purge duration based on the determined gross stack current. Microcontroller 40 can, for example, rely on a lookup table stored in the persistent memory 42, or can calculate the purge duration based on an empirically derived formula. A preferred empirically derived relationship for the illustrated system 10 employs a "pulsed purge" comprising two brief purges, each of a purge duration $T_1$ with a closed ("hold") period (e.g., 0.5 seconds) between the first and second purges. Additionally, this preferred empirically derived relationship employs an inter-purge duration $T_2$ (with $T_2$ greater than the hold period) following the second purge, before another purge sequence is permitted. $T_1$ and $T_2$ can be linear functions of the average stack current between 0 amps and 55 amps. At an average stack current of 0 amps, $T_1$ is equal to approximately 0.5 seconds and $T_2$ is equal to approximately 6 seconds. At an average stack current of 55 amps and greater, $T_1$ is equal to approximately 1.5 seconds and $T_2$ is equal to approximately 2.5 seconds.

Alternatively, microcontroller 40 can employ predefined purge durations, which may simplify the structure and operation of fuel cell system 10, although the purging may not be as effective as a purge in which the purge duration is based on the measured stack current. In this alternative, microcontroller 40 may rely on one or more predefined purge durations, which may vary in length.

Alternatively, or additionally, microcontroller 40 can employ the longer of a predefined purge duration and a purge duration determined based on the average stack current measurement. This ensures the execution of a purge of at least a minimum purge duration.

In a further alternative, microcontroller 40 can monitor the average cell voltage across the purge cell portion 36 and the average cell voltage across fuel cell stack 12, closing the purge valve 70 when the average cell voltage across the purge cell portion 36 exceeds a defined percentage of the average cell voltage of fuel cell stack 12. The defined percentage may be the same as, or may be different from the percentage used as the purge triggering condition. This alternative ensures that the purge duration is limited to that required to achieve an acceptable improvement. A maximum purge duration can be defined, so that if the average cell voltage across the purge cell portion 36 does not exceeds the defined percentage of the average cell voltage of fuel cell stack 12 during the maximum purge duration, the purge valve is closed, and optionally other control steps are initiated.

Employing a threshold percentage of the average cell voltage of the stack in determining the purge triggering condition and/or the purge duration permits fuel cell system 10 to accommodate operational and environmental changes that affect the overall operation and performance of the fuel cell system, that a fixed figure such as a predefined absolute threshold voltage would not accommodate.

Fuel cell system 10 can also employ different predefined purge durations during various operational states to more precisely match the purging to fuel cell system 10 requirements. For example, fuel cell system 10 can employ a startup purge duration while operating in a starting state, and a shutdown purge duration while operating in a stopping state. In addition, fuel cell system 10 can calculate the purge duration based on the stack current or employ a different predefined purge duration during running and/or warning states.

Additionally, fuel cell system 10 can employ a resuscitation purge duration while purging fuel cell stack 12 during a resuscitation cycle. As described in detail in commonly assigned U.S. patent application Ser. No. 09/916,213, titled "FUEL CELL RESUSCITATION METHOD AND APPARATUS", now U.S. Pat. No. 6,861,167, resuscitation is a procedure in which the flow rate of oxidant through fuel cell stack 12 is temporarily increased for a resuscitation duration that can improve the performance of fuel cell stack 12 in certain circumstances.

In step 208, microcontroller 40 resets a timer, starting the timer in step 210. In step 212, microcontroller 40 sends a signal to the purge valve controller CS4 to open purge valve 70.

In step 214, microcontroller 40 executes a first wait loop 216 if the timer is not equal to or greater than purge duration $T_1$. In step 214, microcontroller 40 passes control to step 218 if the timer equals or is greater than purge duration $T_1$.

In step 218, microcontroller 40 sends a signal to the purge valve controller CS4 to close purge valve 70.

In step 220, microcontroller 40 resets the timer for a hold period between successive pulsed openings of the purge valve 70, starting the timer in step 222. A suitable hold period for the described embodiment is approximately 0.5 seconds. In step 224, microcontroller 40 executes a second wait loop 226 if the timer is not greater than a hold period. In step 220, microcontroller 40 passes control to step 228 if the timer is greater than or equal to the hold period.

In step 228, the microcontroller resets the timer for the second purge pulse of purge duration $T_1$, starting the timer in step 230. In step 232, microcontroller 40 sends a signal to the purge valve controller CS4 to open the purge valve 70. In step 234, microcontroller 40 executes a third wait loop 236 if the timer is not equal to or greater than purge duration $T_1$. In step 234, the microcontroller passes control to step 238 if the timer is equal to or greater than purge duration $T_1$. In step 238, microcontroller 40 sends a signal to the purge valve controller CS4 to close purge valve 70.

In this embodiment, the fuel cell system employs a "pulsed" purge, opening the purge valve 70 at two separate instances, each of a purge duration $T_1$. Applicants have empirically determined that better results may be achieved using such a pulsed opening of the purge valve 70, with a brief delay between the two or more pulses. This does not necessarily limit the invention, and where claimed as such the invention may cover a single opening of the purge valve 70, two successive openings, or more than two successive openings of the purge valve 70. Additionally, successive openings within a single pulsed purge may be for equal durations $T_1$ or for different durations.

In step 240, the microcontroller 40 resets the timer for entering an inter-purge duration $T_2$, starting the timer in step 242. As described above, inter-purge duration $T_2$ is a time immediately following the completion of the purging of fuel cell stack 12, during which microcontroller 40 will not open the purge valve 70 (except, in some cases, in response to a particular condition, such as resuscitation condition). A suitable inter-purge period $T_2$ for the described embodiment is between approximately 2.5 and 6 seconds.

In optional further step 244, microcontroller 40 checks the voltage across pairs of fuel cells, similar to the fuel cell resuscitation check described in commonly assigned U.S. patent application Ser. No 09/916,213, entitled FUEL CELL RESUSCITATION METHOD AND APPARATUS, now U.S. Pat. No. 6,861,167. If the voltage across any pair of fuel cell assemblies 16 is less than the cell pair threshold voltage, microcontroller 40 enters the resuscitation cycle terminating the purge method 200 in step 250. If the voltage across any pair of fuel cell assemblies 16 is not less than the cell pair threshold voltage, microcontroller 40 prevents the purge valve 70 from opening in step 252 and determines if the timer is equal to or greater than the inter-purge duration in step 254. If the timer is not equal to or greater than the inter-purge duration $T_2$, microcontroller 40 executes a fourth wait loop 256. Otherwise microcontroller 40 terminates the purge method 200 in step 250. The purge techniques and apparatus described herein may also be applicable to fuel cell systems operating on substantially pure oxidant streams which are dead-ended, and have a purge valve associated with the oxidant channels for periodic venting of accumulations of non-reactive components.

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other fuel cell systems, not necessarily the PME fuel cell system described above.

Commonly assigned U.S. patent applications Ser. No. 09/916,241 entitled FUEL CELL AMBIENT ENVIRONMENT MONITORING AND CONTROL APPARATUS AND METHOD, now U.S. Pat. No. 6,815,101; Ser. No. 09/916,117, entitled FUEL CELL CONTROLLER SELF INSPECTION; Ser. No. 09/916,115, entitled FUEL CELL ANOMALY DETECTION METHOD AND APPARATUS; Ser. No. 09/916,213, entitled FUEL CELL RESUSCITATION METHOD AND APPARATUS, now U.S. Pat. No. 6,861,167; Ser. No. 09/916,240, entitled FUEL CELL SYSTEM METHOD, APPARATUS AND SCHEDULING, now U.S. Pat. No. 6,887,606; Ser. No. 09/916,239, entitled FUEL CELL SYSTEM AUTOMATIC POWER SWITCHING METHOD AND APPARATUS; Ser. No. 09/916,118, entitled PRODUCT WATER PUMP FOR FUEL CELL SYSTEM, now abandoned; and Ser. No. 09/916,212, entitled FUEL CELL SYSTEM HAVING A HYDROGEN SENSOR, all filed Jul. 25, 2001, are incorporated herein by reference, in their entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

What is claimed is:

1. A purge system for a fuel cell stack, comprising:
a purge valve to regulate flow from the fuel cell stack;
an actuator coupled to open and close the purge valve;
a purge cell voltage sensor coupled across at least one fuel cell forming a purge cell portion of the fuel cell stack to determine the voltage across the purge cell portion;
a fuel cell voltage sensor coupled across at least two fuel cells in the fuel cell stack to determine the voltage across the fuel cells; and
a controller coupled to provide control signals to the actuator to open the purge valve when an average voltage across the purge cell portion of the fuel cell stack falls below a defined first percentage of a threshold voltage measured across the at least two fuel cells wherein the controller is further coupled to provide control signals to the actuator to close the purge valve after a determined purge duration has elapsed, the determination of purge duration being based on a flow of current through the fuel cell stack wherein the controller is further coupled to provide control signals to the actuator to close the purge valve when the average purge cell voltage rises above a defined second percentage of the average fuel cell voltage and wherein the defined second percentage is different than the defined first percentage.

2. A purge system for a fuel cell stack, comprising:
a purge valve to regulate flow from the fuel cell stack;
an actuator coupled to open and close the purge valve;
a purge cell voltage sensor coupled across at least one fuel cell forming a purge cell portion of the fuel cell stack to determine the voltage across the purge cell portion;
a fuel cell voltage sensor coupled across at least two fuel cells in the fuel cell stack to determine the voltage across the fuel cells; and
a controller coupled to provide control signals to the actuator to open the purge valve when an average voltage across the purge cell portion of the fuel pell stack falls below a defined first percentage of a threshold voltage measured across the at least two fuel cells wherein the controller is further coupled to provide control signals to the actuator to close the purge valve after a determined purge duration has elapsed, the determination of purge duration being based on a flow of current through the fuel cell stack wherein the controller is further coupled to provide control signals to the actuator to close the purge valve when the average purge cell voltage rises above a defined second percentage of the average fuel cell voltage and wherein the defined second percentage is greater than the first percentage.

3. A fuel cell system, comprising:
a fuel cell stack having a plurality of fuel cells;
a purge valve to regulate a purge discharge from the fuel cell stack;
an actuator coupled to open and close the purge valve; and
a controller coupled to control the actuator to open and close the purge valve in a pulsed purge sequence when a fuel cell stack purge condition exists, the pulsed purge sequence comprising:
opening the valve for a purge duration;
closing the purge valve after the purge duration for a hold period;
repeating the opening and closing of the valve at least once; and then
keeping the valve closed for an inter-purge duration before any subsequent purge.

4. The fuel cell system of claim 3 wherein the controller is configured to determine if a stack purge condition exists by determining if an average purge cell voltage across a purge cell portion of a fuel cell stack exceeds a percentage of an average fuel cell voltage across at least a portion of the fuel cell stack.

5. The fuel cell system of claim 3 wherein the inter-purge duration is longer than each of the at least one purge duration and hold period in the pulsed purge sequence.

6. A method of operating a fuel cell purge system with a pulsed purge sequence, comprising:
determining that a fuel cell stack purge condition exists;
operating a purge valve in a pulsed purge sequence comprising:
opening the valve for a purge duration;
closing the purge valve after the purge duration for a hold period;
repeating the opening and closing of the valve at least once for a second purge duration; and then
keeping the valve closed for an inter-purge duration before any subsequent purge.

7. The method of claim 6 wherein the inter-purge duration is longer than each of the at least one purge duration and hold period in the pulsed purge sequence.

8. The method of claim 6 wherein the first purge duration is the same as the second purge duration.

9. The method of claim 6 wherein the first purge duration is different than the second purge duration.

10. The method of claim 6, further comprising:
determining at least one of the first and the second purge durations based on a fuel cell stack current.

11. The method of claim 6 wherein determining that a fuel cell stack purge condition exists includes:
determining if an average purge cell voltage across a purse cell portion of a fuel cell stack exceeds a percentage of an average fuel cell voltage across at least a portion of the fuel cell stack.

12. A method of operating a fuel cell purge system, comprising:
monitoring an average purge cell voltage across a purge cell portion of a fuel cell stack;
monitoring an average fuel cell voltage across at least a portion of the fuel cell stack;
opening a purge valve if the average purge cell voltage falls below a first defined percentage of the average fuel cell voltage;
determining a current flow through the fuel cell stack;
determining a purge duration based on the determined current flow; and
closing the purge valve following a most recently determined one of the determined purge durations after opening the purge valve, wherein the second defined percentage is different than the first defined percentage.

13. A computer-readable media containing instructions to cause a processor to control operation of a fuel cell system, by:
determining that a fuel cell stack purge condition exists;
operating a purge valve in a pulsed purge sequence comprising:
opening the valve for a purge duration;
closing the purge valve after the purge duration for a hold period;
repeating the opening and closing of the valve at least once; and then
keeping the valve closed for an inter-purge duration before any subsequent purge.

* * * * *

UNITED STATES PATENT AND TRADEMARK OFFICE
CERTIFICATE OF CORRECTION

PATENT NO. : 6,960,401 B2
DATED : November 1, 2005
INVENTOR(S) : Russell Howard Barton et al.

It is certified that error appears in the above-identified patent and that said Letters Patent is hereby corrected as shown below:

Tilte page,
Item [56], References Cited, U.S. PATENT DOCUMENTS,
"3,553,029   A   1/1971   Winsel   136/86" should read as
-- 3,553,026   A   1/1971   Winsel   136/86 --.

Signed and Sealed this

Thirty-first Day of January, 2006

JON W. DUDAS
*Director of the United States Patent and Trademark Office*